United States Patent
Maggioni

(10) Patent No.: US 10,071,865 B2
(45) Date of Patent: Sep. 11, 2018

(54) MACHINE FOR SEPARATING ELEMENTS

(71) Applicant: BÜHLER AG, Uzwil (CH)

(72) Inventor: Roberto Maggioni, Gorgonzola (IT)

(73) Assignee: BÜHLER AG, Uzwil (CH)

( * ) Notice: Subject to any disclaimer, the term of this patent is extended or adjusted under 35 U.S.C. 154(b) by 0 days.

(21) Appl. No.: 15/122,994

(22) PCT Filed: Mar. 5, 2015

(86) PCT No.: PCT/EP2015/054599
§ 371 (c)(1),
(2) Date: Sep. 1, 2016

(87) PCT Pub. No.: WO2015/132335
PCT Pub. Date: Sep. 11, 2015

(65) Prior Publication Data
US 2017/0107059 A1    Apr. 20, 2017

(30) Foreign Application Priority Data
Mar. 5, 2014 (IT) .............................. MI2014A0342

(51) Int. Cl.
*B65G 43/08* (2006.01)
*B65G 11/02* (2006.01)
(Continued)

(52) U.S. Cl.
CPC .............. *B65G 43/08* (2013.01); *B65G 11/02* (2013.01); *B65G 27/04* (2013.01); *B65G 27/24* (2013.01);
(Continued)

(58) Field of Classification Search
CPC ........ B65G 43/08; B65G 11/02; B65G 27/04; B65G 47/846; B65G 2201/0211; B65G 2203/042
See application file for complete search history.

(56) References Cited

U.S. PATENT DOCUMENTS 3,917,050 A    11/1975  Gregor
4,146,123 A  *  3/1979  Cottrell .............. B65G 47/1421
                                              198/382
(Continued)

FOREIGN PATENT DOCUMENTS

EP    0 583 899 A1    2/1994
GB    143 628          5/1920
(Continued)

OTHER PUBLICATIONS

International Search Report Corresponding to PCT/EP2015/054599 dated May 11, 2015.
(Continued)

*Primary Examiner* — Mark A Deuble
(74) *Attorney, Agent, or Firm* — Davis & Bujold PLLC; Michael J. Bujold

(57) ABSTRACT

A machine (1) for separating elements (100) comprising multiple tracks (2), each of which defines a feed track (2a), wherein the track (2) includes an outlet opening (20) through which the elements (100) exit; multiple vibration devices (3), each of which is individually connected to only one track (2) and suited for transmitting mechanical vibrations to the connected track (2) to generate feed of the elements (100) along the feed track (2a); a detection mechanism (4) for detecting the elements (100) which leave the track (2) through the outlet opening (20); a control mechanism (5) for controlling the separation machine (1) which control mechanism is functionally connected to the detection mechanism (4) and the vibration devices (3) and suited for commanding stop of one of the vibration devices (3), if the detection mechanism (4) detects passage of an element (100) through the outlet opening (20) of the connected track (2).

7 Claims, 8 Drawing Sheets

(51) Int. Cl.
  *B65G 27/04* (2006.01)
  *B65G 27/24* (2006.01)
  *B65G 47/84* (2006.01)

(52) U.S. Cl.
  CPC .... *B65G 47/846* (2013.01); *B65G 2201/0211* (2013.01); *B65G 2203/042* (2013.01)

(56) References Cited

U.S. PATENT DOCUMENTS

| | | | | |
|---|---|---|---|---|
| 4,744,458 | A * | 5/1988 | Fluck | B65B 23/12 198/460.3 |
| 5,190,139 | A | 3/1993 | Maggioni | |
| 5,277,300 | A * | 1/1994 | Maggioni | B65G 27/34 198/752.1 |
| 8,960,414 | B2 * | 2/2015 | Bassani | B65G 27/08 198/752.1 |
| 9,781,338 | B2 * | 10/2017 | Chan | H04N 5/23229 |
| 2006/0070927 | A1 * | 4/2006 | Henry | A21C 15/00 209/539 |
| 2008/0307757 | A1 * | 12/2008 | Heim | B65G 27/04 53/500 |
| 2013/0313169 | A1 * | 11/2013 | Lapeyre | B07C 5/38 209/546 |
| 2014/0116571 | A1 * | 5/2014 | Bassani | B65G 27/04 141/69 |
| 2014/0142747 | A1 * | 5/2014 | Magato | B65G 43/08 700/230 |
| 2017/0287161 | A1 * | 10/2017 | Daniel Chan | G06T 7/70 |

FOREIGN PATENT DOCUMENTS

| | | |
|---|---|---|
| IT | MI2013A001656 A1 | 4/2015 |
| WO | 2010/059036 A1 | 5/2010 |
| WO | 2015/052157 A1 | 4/2015 |

OTHER PUBLICATIONS

Written Opinion Corresponding to PCT/EP2015/054599 dated May 11, 2015.

* cited by examiner

MACHINE FOR SEPARATING ELEMENTS

The present invention relates to a machine for separating elements, in particular for foodstuffs, such as, for example, dried fruit or the like, in the manner as explained in the introductory part of the first patent claim.

Separating machines are currently necessary in foodstuff production and in particular in confectionary production, which machines, by taking dried fruit from an unordered pile, are able to arrange the individual dried fruit elements in suitable positions. Such machines are also necessary in many other branches of industry.

The machines operate with paths of small width in order to permit the feeding of individual dried fruit elements. The feeding of the dried fruit on the paths is additionally made possible by the presence of a shaking device which transmits vectorial vibrations to the paths at suitable time intervals such that said shaking device permits the feeding of the dried fruit because of the vibrations.

The dried fruit is then forwarded to molds which are specially provided for this purpose and which are subsequently also filled, for example, with melted foodstuffs, such as chocolate and the like.

The abovementioned prior art has a number of significant disadvantages.

The feeding of the elements namely turns out to be highly irregular. The irregularity can be attributed to the differences, which are always present, even to a minimal extent, between the paths and the elements and are reinforced by the shaking conveyor system.

Said differences are significantly greater if foodstuffs or other natural elements are involved which significantly differ from one another.

It therefore proves highly problematic to produce separating machines with a plurality of paths which can operate in a manner synchronized in sequence or can output elements at a certain time during the process, a feature which, however, would be required in order to achieve economic, rapid and optimum production.

In addition, separating machines are highly complex. The complexity brings about increased costs and requires continuous maintenance which additionally increases the costs.

The complexity also brings about increased vulnerability of the device. This vulnerability can lead to fractures in the shaking devices and in the devices connected thereto, which in turn lead to problematic interruptions in production.

In view of this situation, the technical object on which the present invention is based consists in inventing a machine for separating elements, which is capable of substantially counteracting the disadvantages mentioned.

An important objective within the scope of the technical object consists in obtaining a machine for separating elements, which makes it possible to synchronize or to regulate and/or control the exiting of the elements from the paths.

A further important, objective of the invention consists in inventing and in obtaining a machine for separating elements which is simple and economic.

The technical object and the objectives just depicted are achieved and obtained by a machine for separating elements as claimed in the appended independent claims.

Preferred embodiments are depicted in the dependent claims.

The machine for separating elements comprises a plurality of paths, of which each forms a feed path and each is suitable for forwarding the elements lined up along the feed path, wherein the path includes an outlet opening through which the elements exit, and at least one shaking device which is connected to at least one of the paths and can transmit mechanical vibrations to the connected path in order to bring about the feeding of the elements along the feed path.

The method analogously preferably comprises a phase of channeling the elements along a plurality of paths, of which each forms a feed path, a phase of forwarding the elements along the feed path to the outlet openings through which the elements exit, wherein the forwarding phase takes place by means of mechanical vibrations which are transmitted to the individual paths.

The machine and the method furthermore have means for the or a phase of detection of the elements leaving the path, which means for detection can essentially detect the passage of the elements through the outlet opening, and control means which are functionally connected to the detection means and to the shaking devices and can order the stoppage of one of the shaking devices if the means for detection detect the passage of an element through the outlet, opening of the connected path.

It is therefore clear that, by stopping the shaking devices, the forwarding of the elements can be precisely controlled. It has to be noted at this juncture that stopping of the shaking device should not necessarily be synonymous with a shut-down of the shaking device.

By changing the vibration properties of the shaking device, such as, for example, the frequency or amplitude of the vibration, the effect can be achieved that the elements no longer leave the respective path or at least that the elements are conveyed more slowly than during normal operation.

An alternative or preferred refinement of the machine has at least two paths, of which each forms a feed path and each is suitable in order to forward the elements lined up along the feed path, wherein each path has an outlet opening for the elements.

For each path, at least one shaking device is provided which can transmit mechanical vibrations to the connected path in order to bring about the feeding of the elements along the feed path.

Means, preferably optical means, for detection of the elements leaving the path are furthermore present. The means are designed to detect the passage of the elements through the outlet opening and to generate a corresponding signal.

Alternatively, the means can also be designed as mechanical and/or acoustic means, for example with ultrasound.

Furthermore, control means of the separating machine are present, which are functionally connected to the detection means and to the shaking devices and regulate and/or control the vibrations of the shaking devices depending on the signal generated by the means.

By means of the regulation and/or control depending on the signal generated by the means, each path can therefore be moved in such a manner that the elements are conveyed as desired. It can therefore be ensured, for example, that a precisely defined number of elements leaves the path in a certain process step or in a certain process phase.

An alternative or preferred method for separating elements preferably comprises a phase of channeling the elements along at least two paths, of which each forms a feed path, and a phase of forwarding the elements along the feed path to outlet openings for the elements, wherein the forwarding phase takes place by means of mechanical vibrations which are transmitted to the individual paths.

Detection of the elements leaving the path takes place here, in which the passage of the elements through the outlet opening is detected and a corresponding signal is generated.

The detection preferably takes place as described above for the machine.

The mechanical vibrations transmitted to each individual path are regulated and/or controlled depending on the signal generated during the detection of the elements.

The features and advantages of the invention are explained below by the detailed description of a preferred embodiment of the invention with reference to the attached drawings, wherein.

Figure 1:
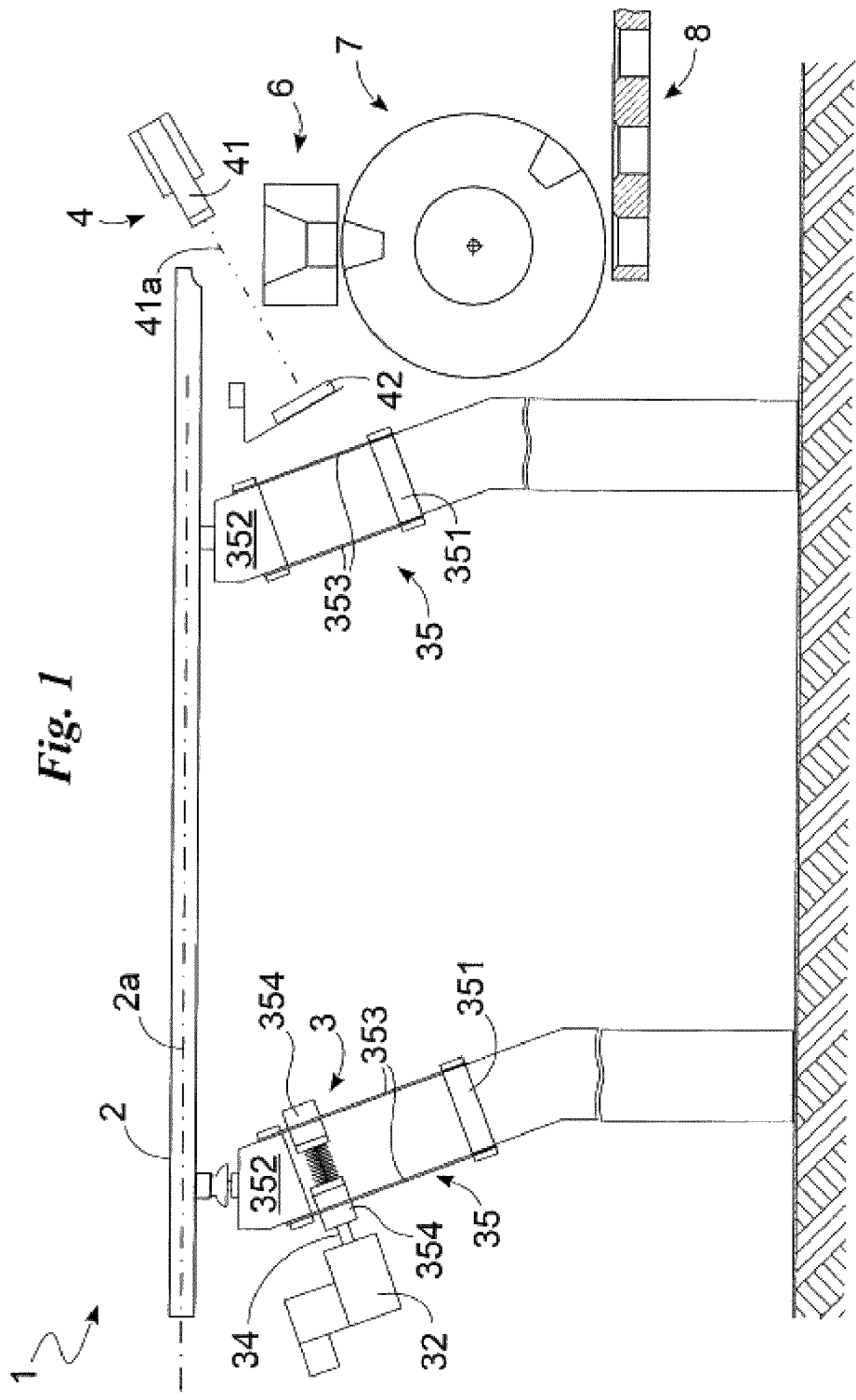
FIG. 1 shows a first schematic illustration of a machine according to the invention for separating elements.

With reference to the figures mentioned, a separating machine according to the invention is indicated in its entirety by the number 1.

It is suitable for separating elements 100, more precisely foodstuffs, in particular dried fruit, for example for foodstuffs and in particular for candy, for example hazelnuts and peanuts.

The separating machine 1 comprises a plurality of paths 2, of which each forms a feed path 2a and is suitable for forwarding the lined-up elements 100, preferably one after another, along the feed path 2a. Each path 2 is preferably horizontal or, alternatively thereto, inclined slightly, and therefore the objects 100 are also shifted by gravity, and includes an outlet opening, through which the elements 100 exit, in the portion having the lowest gravity potential, i.e. in the lowermost part. The paths 2 are preferably made of metal with a trapezoidal cross section without the longer base side which is directed virtually upward.

In the attached drawings, only a single path 2 can be seen because said paths are oriented along the direction perpendicular to the plane of the figure and therefore are not visible.

The separating machine 1 also comprises a plurality of shaking devices 3, of which each is connected preferably to only one path 2 and can transmit mechanical vibrations to the connected path 2 such that the feeding of the elements 100 along the feed path 2a is brought about.

Figure 2:
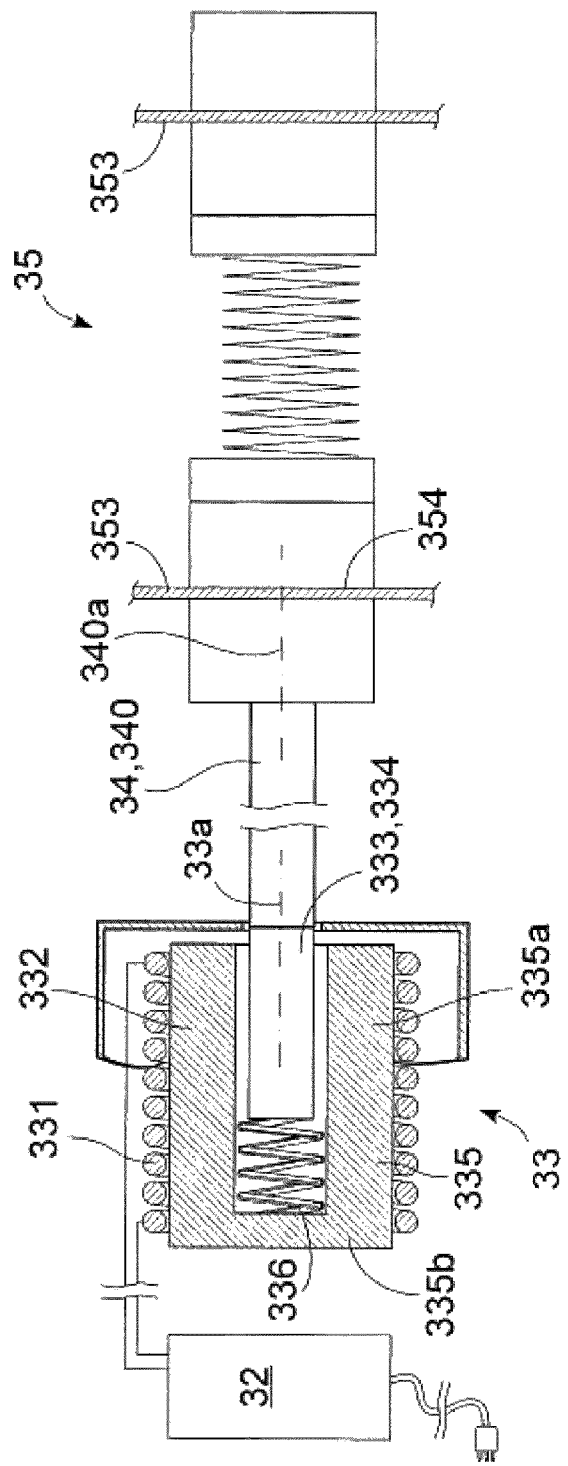
FIG. 2 shows a part of the machine from FIG. 1, the shaking device according to the invention, in cross section.
Figure 3A:
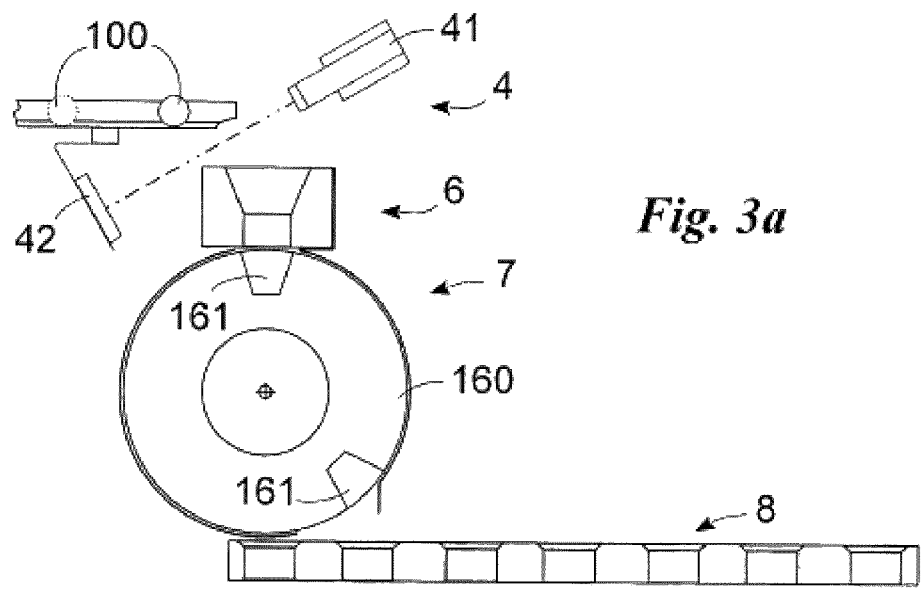
FIG. 3a illustrates a part of the separating machine of FIG. 1 in a first configuration.
Figure 3B:
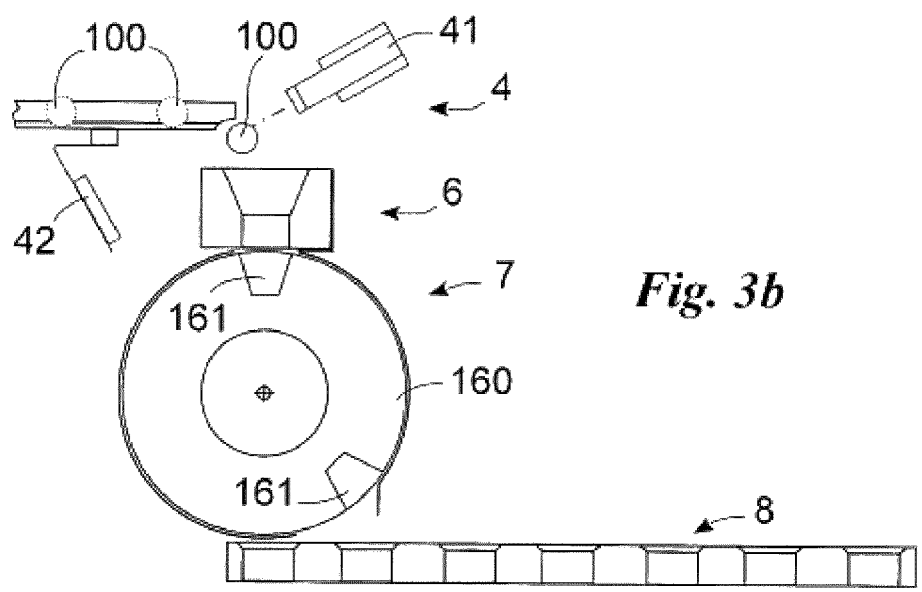
FIG. 3b illustrates a part of the separating machine from FIG. 1 in a second configuration.
Figure 3C:
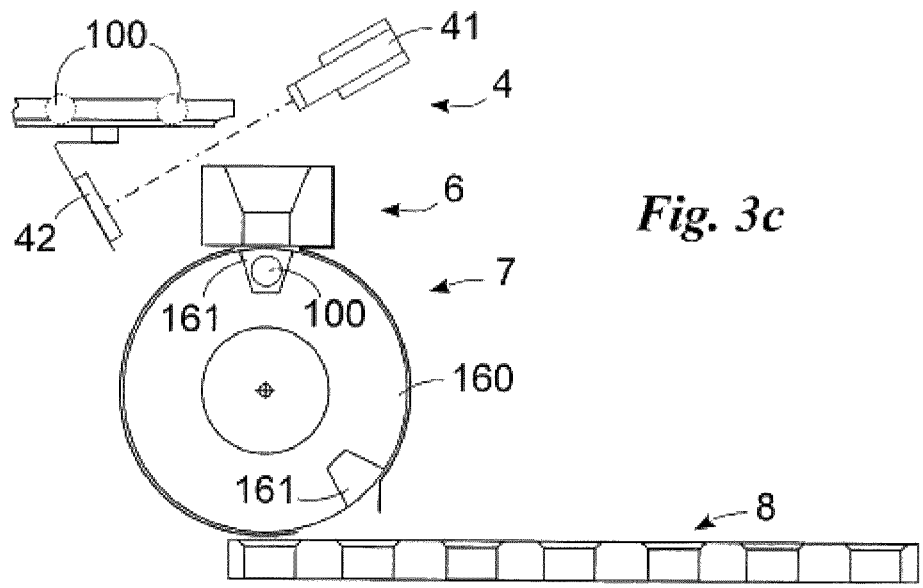
FIG. 3c illustrates a part of the separating machine from FIG. 1 in a third configuration.
Figure 3D:
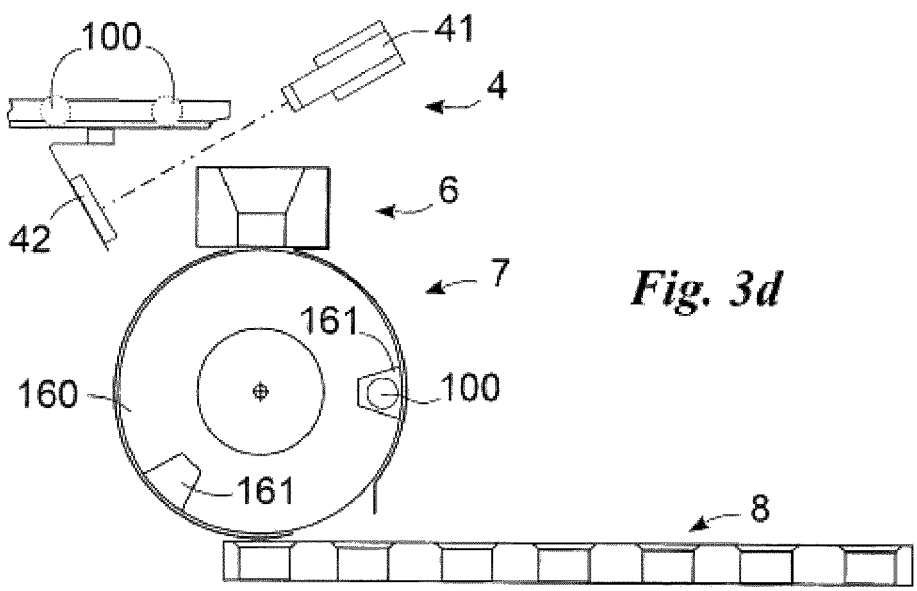
FIG. 3d illustrates a part of the separating machine from FIG. 1 in a fourth configuration.
Figure 3E:
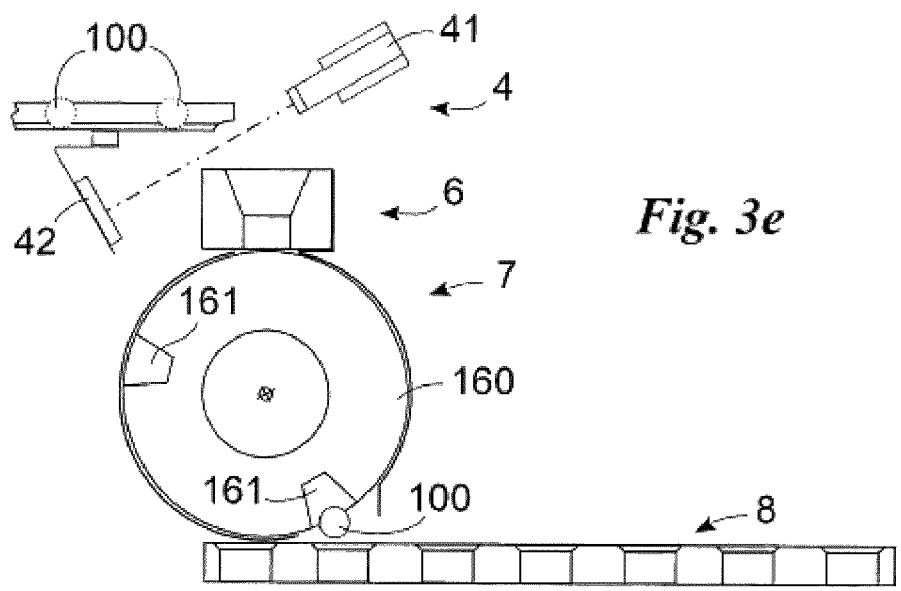
FIG. 3e illustrates a part of the separating machine from FIG. 1 in a fifth configuration.
Figure 3F:
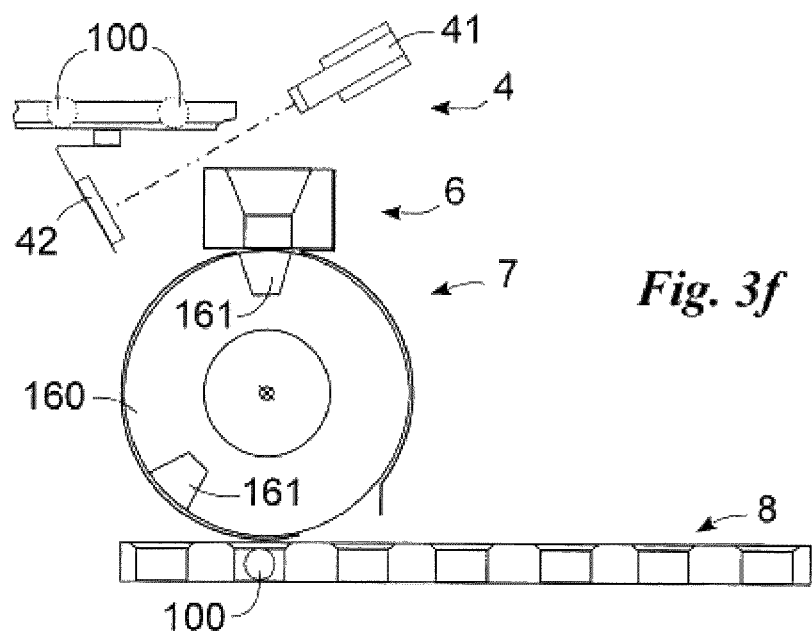
FIG. 3f illustrates a part of the separating machine from FIG. 1 in a sixth configuration.
Figure 4A:
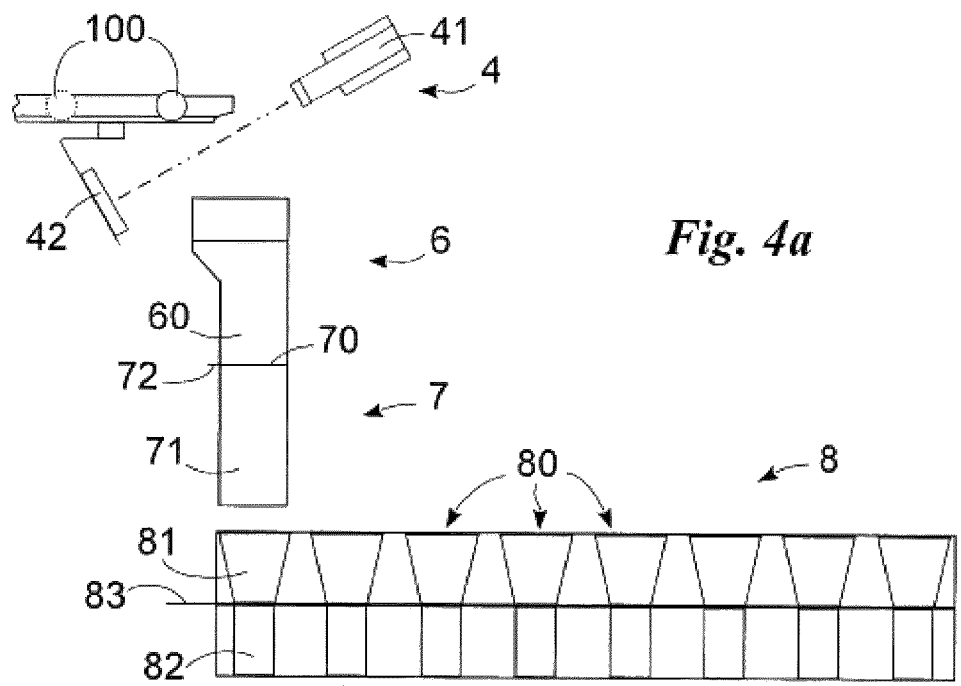
FIG. 4a illustrates a part of a variant of the separating machine according to the invention in a first configuration.
Figure 4B:
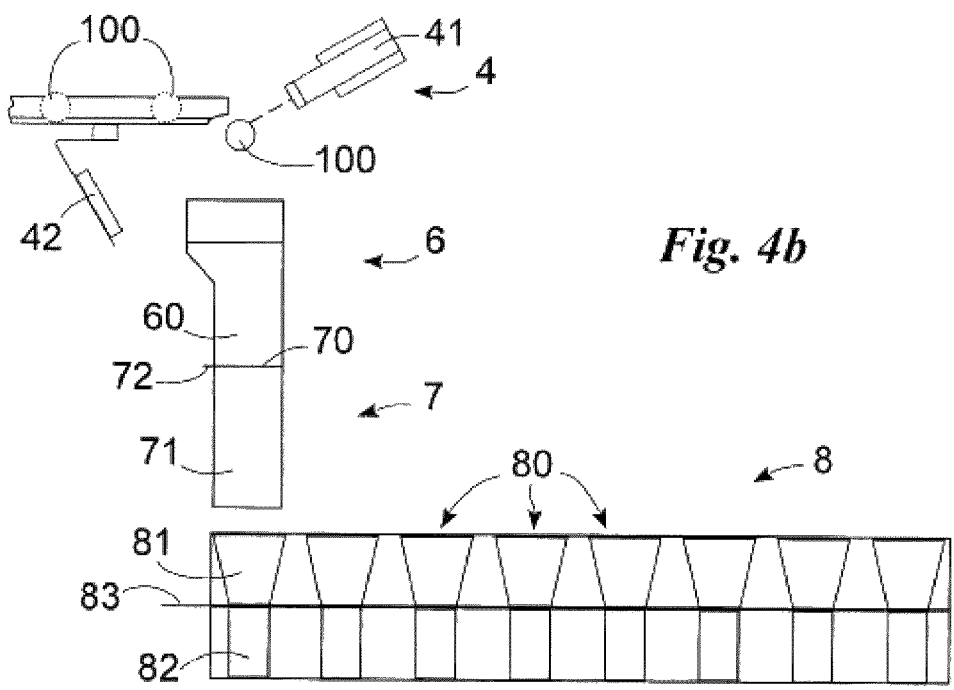
FIG. 4b illustrates the variant of the separating machine from FIG. 4a in a second configuration.
Figure 4C:
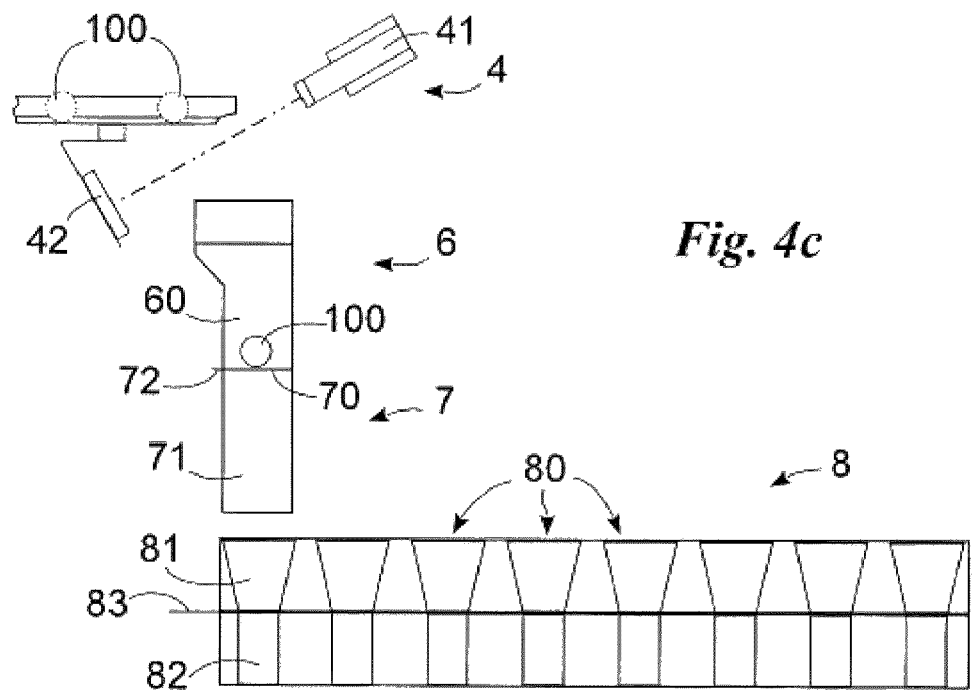
FIG. 4c illustrates the variant of the separating machine from FIG. 4a in a third configuration.
Figure 4D:
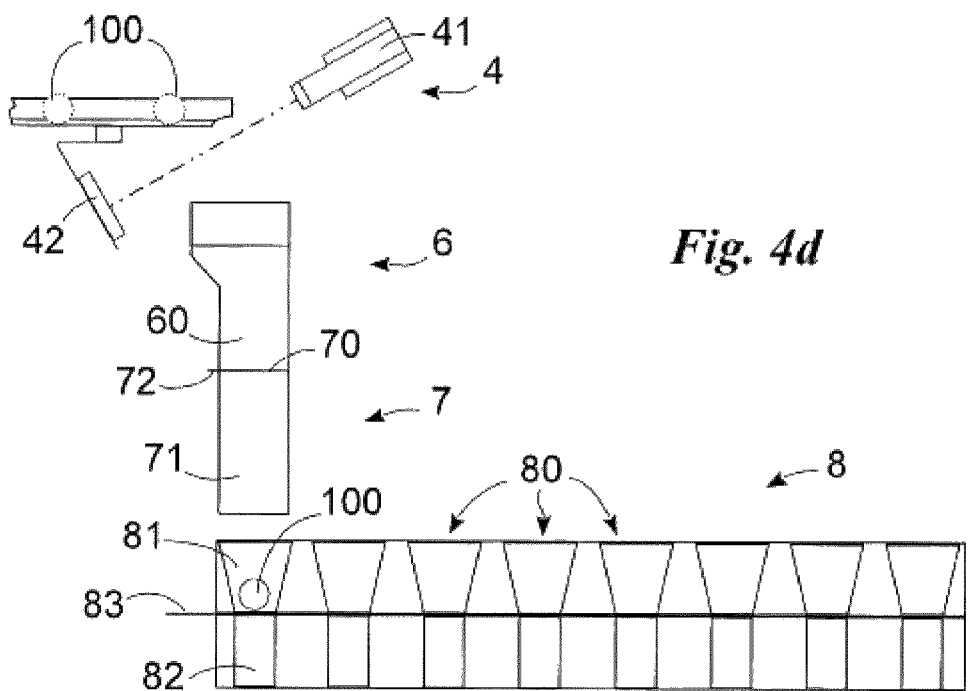
FIG. 4d illustrates the variant of the separating machine from FIG. 4a in a fourth configuration.
Figure 4E:
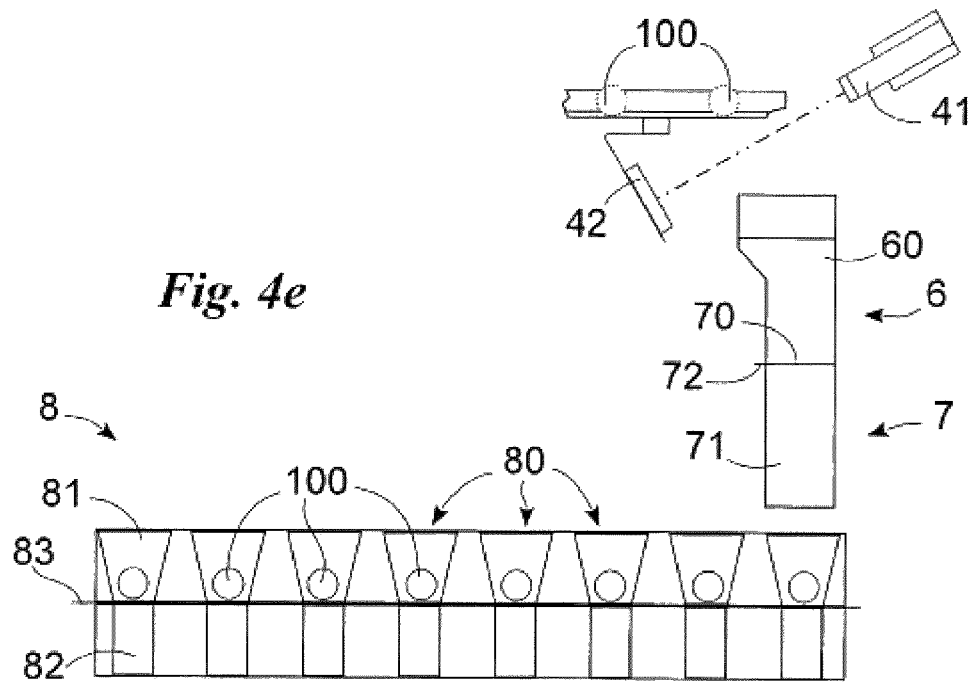
FIG. 4e illustrates the variant of the separating machine from FIG. 4a in a fifth configuration.
Figure 4F:
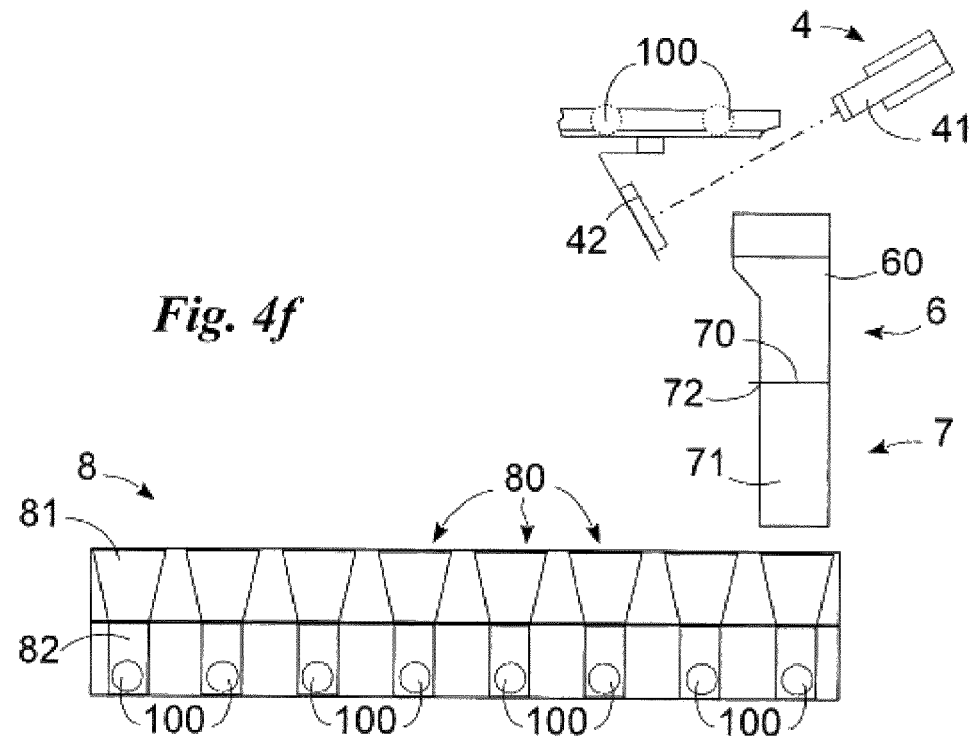
FIG. 4f illustrates a variant of the separating machine from FIG. 4a in a sixth configuration.

The shaking devices 3 are preferably of the type as illustrated in the same applicant's Italian patent application MI2013A001656 from page 3 to page 8 and in FIGS. 1-3.

The snaking device 3 is arranged on a holding plane 1a of the machine 1, that is to say on the base or on an element fixedly connected thereto. Said shaking device can transmit vectorial vibrations to the paths 2 such that the objects 100 are moved along the feed path 2a in the feeding direction.

In summary, each shaking device 3 comprises means for generation of an electromagnetic wave 32, an electromagnetic drive 33 which can generate vibrations in respect of the holding plane 1a, preferably an amplifier 35 which can amplify the vibrations which the electromagnetic drive 33 has generated, and transmission members 34 which can transmit the vibrations to the connected path 2.

Alternatively or additionally, a pneumatically or hydraulically driven means or a piezo-electrically driven means can be provided for generation of the vibrations.

Put more precisely, the means for generation of the electromagnetic wave 32 are electronic means which are known per se and are connected to the power supply, to batteries or to something different, and can generate a mechanical wave or an electromagnetic signal in a desired and possibly preset form and frequency. Said means are suitable in particular for generating a square wave with frequencies preferably between 0.5 s and 10 ms and even better between 100 ms and 50 ms, a voltage of between 15 V and 30 V, preferably 24, and an electric current of between 0.5 A and 2 A, preferably 1 A. It is even more preferable if the square wave oscillates between a positive phase between the stated voltages and frequencies and a zero phase; in addition, the positive phase preferably has a longer duration in comparison to the negative phase, preferably of more than twice the length and even better of between twice and three times the length. Similar means are used, for example, in distorters of electronic music instruments or in similar devices of various types and can easily be produced by a person skilled in the art who is well versed in the industry.

The means for generation 32 are arranged on the holding plane 1a and are electrically connected to the electromagnetic drive 33. The electromagnetic wave 32 is in particular sent directly to the electromagnetic drive 33.

The electromagnetic drive 33 is fastened to the holding plane 1a and can generate vibrations in respect of the holding plane 1a with a frequency and magnitude correlated with the electromagnetic wave. The electromagnetic drive 33 essentially converts the electromagnetic waves into mechanical vibrations.

The electromagnetic drive 33 comprises, for example, a cylindrical coil 331 which is suitably connected directly to the means for generation 32, a ferromagnetic element 332 in the cylindrical coil 331, which ferromagnetic element can be magnetized by the electric current present in the cylindrical coil 331, and a permanent magnet 333. In addition, of the ferromagnetic element 332 and of the permanent magnet 333, one is an element 334 which can oscillate in respect of the holding plane 1a. The oscillations are generated because of the fluctuation in the electromagnetic properties of the ferromagnetic element 332, which can be attributed to the fluctuation in the polarity or in the intensity of the electric current in the cylindrical coil 331, and generate the vibrations.

The vibrations preferably have the same frequencies as the electromagnetic waves mentioned and a magnitude of between 1 mm and 1 cm and even better, of between 3 mm and 4 mm.

The element 334 which can oscillate is preferably the ferromagnetic element and suitably a prismatic or cylindrical or similar element which is arranged concentrically on a fixed element 335 which is fixedly connected to the holding plane 1a and is suitably formed by the permanent magnet 333. The fixed element 335 is preferably cylindrical or similar and is preferably an element with side walls 335a and only one base surface 335b which can hold the element which can oscillate.

In addition, an elastic element 336 which can react against the displacements because of the electromagnetic forces is preferably fitted between the base surface 335b and the element 334 which can oscillate.

Finally, the fixed element 335 is suitably surrounded by the cylindrical coil 331, and the axis of the cylindrical coil 33a suitably coincides with the predominant direction of extent of the element 334 which can oscillate and preferably also with the depression in the fixed element and therefore preferably with the direction of the oscillations of the element which can oscillate.

The element 334 which can oscillate is mechanically connected to the transmission members 34. The latter preferably comprise and/or consist of a transmission shaft 340 which is directly connected to the element 334 which can oscillate, arid preferably has an axis 340a which coincides with the axis of the cylindrical coil 33a.

The amplifier 35 which can amplify the vibrations generated by the electromagnetic drive 33 comprises at least one fixed part 351 which is fixedly connected to the holding plane 1a, at least one movable part 352 which is fixedly connected to the path 2, and a loaded part 354 which is fixedly connected to the transmission members 334 and is preferably fixedly connected to the shaft 340, and means for generating potential 353, which can amplify the vibrations transmitted by the shaft 340.

The means for generating potential 353 preferably comprise elastic elements and even better two metal plates which are arranged in parallel and of which one end forms the fixed part 351 and the other end forms the movable part 352. The loaded part 354 is located between the ends which form the parts 351 and 352. Even better, the first metal plate is directly connected to the shaft 340 and the second metal plate is connected to the shaft 340 by a further elastic element.

In addition, the amplifier 35 has a resonant frequency close to the frequency of the vibrations which are generated by the electromagnetic drive 33 and therefore close to the vibrations transmitted by the drive 33, and therefore the mechanical vibrations of the drive 33 are significantly multiplied, in particular with a transmission factor, that is to say with a ratio between output and input vibrations, of greater than 5 and preferably of greater than 10.

As is known, the resonant frequencies namely depend on the physical properties of the system and can simply be selected by a person skilled in the art who is well versed in the industry. Further amplifying devices 3 may be present which are not connected to the shaft 340 and therefore do not constitute the loaded part 354, but rather are exclusively connected via the movable part 352 and the fixed part 351.

The separating machine 1 also comprises means for detection 4 of the elements 100 leaving the paths 2, which means for detection can essentially detect the passage of the elements 100 through the outlet opening. The wording "can essentially detect the passage of the elements 100 through the outlet opening" means that the passage can also be detected in a position in the vicinity of the outlet, but downstream of the outlet.

Said means for detection preferably consist of means for the emission 41 of a light pencil 41a, preferably a laser beam, which can impinge on a sensor 42 if it is not interrupted. The passage of the object 100 interrupts the light pencil 41a. The sensor 42 can therefore detect the passage of the objects 100. A sensor is preferably present for each individual path 2.

The separating machine 1 also comprises control means 5 of the separating machine 1, which control means are functionally connected to the means for detection 4 and to the shaking devices 3. The control means 5 can control the stoppage of one of the shaking devices 3 if the means for detection 4 detect the passage of a or of a defined number of elements 100 through the outlet opening of the path 2 which is connected to the associated shaking devices 3 which are on the point of being stopped. The control means 5 may be electronic or of a similar type.

Stoppage of the shaking device therefore also means that the control means 5 can regulate and/or control the shaking devices 3 in such a manner that the vibration properties are changed, for example the frequency is reduced, and therefore the elements 100 do not leave the paths 2, or at least are conveyed more slowly.

The separating machine 1 comprises means for collection 6 of the objects 100 downstream of the paths 2, which means for collection can collect the objects 100 after they have exited from the paths 2, and means for forwarding 7 the objects 100, which means for forwarding can permit the forwarding of the objects 100 simultaneously from the collection means 6 to a mold 8, and in which the forwarding means 7 can forward the objects 100 if each of the paths 2 has forwarded an object 100 or a defined number of objects 100 into the collection means 6.

A simultaneous forwarding of the objects 100 can also comprise a controlled forwarding, in which the objects 100 are essentially forwarded simultaneously in each case in a certain process phase; for example, the objects 100 can be forwarded simultaneously or sequentially to a respective row of a mold 8.

It is important that the forwarding takes place simultaneously to the presence of a mold 8 located therebelow.

When entering into more detail, at least two variants are provided, a continuous variant or variant provided with rollers, and an interval variant.

In the case of the continuous variant (FIGS. 3a-3f), the collection means 6 comprise a drum 160 which comprises seats 161, preferably two or three seats, for the objects 100 which face the outer surface of the drum 160. In addition, the forwarding means 7 consist of a motor for rotating the drum 160, and the seats 161 face the outlet opening or the mold 8 depending on the angular position of the drum 160. In addition, a guard 162 is preferably provided which can prevent objects 100 from dropping down if they are not in the suitable positions, i.e. face the mold 8 or the collection means.

In the case of the intermittent variant (FIGS. 4a-4f), the collection means 6 comprise a funnel 60 downstream of each path 2, and the forwarding means 7 comprise a partition 70 and a channel 71. The partition 70 is suitable for closing the channel 71, while the forwarding means 7 comprise means for opening 72 the partitions 70, which means for opening can open all of the partitions 70 at the same time, preferably substantially simultaneously, and therefore the simultaneous forwarding of the objects 100 is made possible.

A displaceable mold 8 which comprises a plurality of seats 80 for the objects 100 is present downstream of the channel 71. The mold 8 can be displaced such that the seats can each be positioned individually under the channel 71.

The mold 8 preferably also has, for each seat 80, a funnel part 81 and a receiving part 82 located below the latter, which funnel part and receiving part are preferably likewise separated by a partition 83 which is to be opened and which connects them. In this case, the funnel part 81 can constitute the collection means 60 and the partition 82 to be opened can replace the partition 70.

The manner of operation of the machine for separating 1 elements 100, which machine has been described above in terms of its structure, is as follows.

It is also an innovative method for separating elements 100, preferably of the type described above, and is preferably carried out with the separating machine 1 described above.

Said separating method preferably comprises a phase of channeling the elements 100 along the paths 2 by means of distributors which are known per se.

The channeling phase is followed by a phase of forwarding the elements 100, during which the feeding of the elements 100 takes place by means of mechanical vibrations which are transmitted to the individual paths 2, in particular by the shaking devices 3 described. In this phase, the elements 100 move forward along the feed path 2*a* in the direction of the gravitation gradient to the outlet openings through which the elements 100 exit.

The detection phase begins simultaneously with the exit of the elements. During this phase, the elements 100 leaving the path 2 are detected in particular by the described means for detection 4. The passage of the elements 100 through the outlet opening is therefore essentially detected. In particular, the passage of elements 100 from each individual path is detected.

In addition, during this detection phase, the mechanical vibrations applied to the individual paths 2 are stopped and/or regulated and/or controlled if the passage of an element 100 or a defined number of elements 100 through the outlet opening of the individual path 2 is detected, in particular if the control means receive a corresponding signal generated by the detection means. In particular, the stoppage of the vibrations takes place by means of the command of the control means 5 to the shaking devices 3.

As already explained above, the control means 5 can regulate and/or control the shaking devices 3 in such a manner that the vibration properties are changed, for example the frequency is reduced, and therefore the elements 100 do not leave the paths 2, or leave the latter more slowly.

Owing to the described manner of operation, the objects 100 leave the paths 2 piece by piece, and the situation does not occur in which two objects exit from an individual path 2 if this is not desired while only one object, if any, exits from another path 2.

The detection phase is followed by a collection phase of the objects 100 downstream of the paths 2, in which the objects 100 are collected after they have exited from the paths 2, and the collection phase is followed by a phase of forwarding same objects 100, which phase is carried out if each of the paths 2 has collected one of the objects 100 or the defined number of objects 100 in the collection phase, and takes place substantially simultaneously on all of the paths 2.

If the separating machine 1 is equipped with rollers (FIGS. 3*a*-3*f*), the collection phase takes place in the following manner.

The drums 160 or the drum 160 which can be individually with seats for all the paths rotates and is positioned in such a manner that a seat 161 faces the outlet of the paths 2. All of the paths 2 essentially have a seat 161 which is directed toward the outlet.

The seats 161 are gradually filled, and the vibrations of the path 2 are gradually stopped.

If all of the seats 161 are full, the roller continues simultaneously and synchronously for all of the seats 161 and therefore continues the rotation with respect to all of the paths 2. Consequently, the seats 161 are directed toward the molds 8 where they simultaneously unload the objects 100.

The mold 8 is then displaced, and the operation begins again.

If, by contrast, an intermittent separating machine 1 is involved (FIGS. 4*a*-4*f*), the collection phase takes place in the following manner.

The objects 100 enter the funnel 60 downstream of the outlet of the paths 2. All of the paths 2 essentially have a funnel 60 which faces the outlet.

The funnels 60 are filled bit by bit, and the vibrations of the path 2 are stopped bit by bit. The objects 100 therefore remain lying level with the partitions 70. If all of the funnels 60 are full, the opening means 72 control the simultaneous opening of all the partitions 70, and the objects 100 are forwarded along the channels 71, preferably by the effect of gravity.

Consequently, a first seat 80 of all of the molds 8 in respect of all of the paths 2 is filled.

The mold 8 is displaced, and the operation is repeated such that all of the second seats and all of the seats 80 are filled bit by bit.

At this point, the molds 8 can be transported as they are, or each mold 8 can simultaneously forward all of the objects from the funnel part 814 to the receiving part 80 by opening of the partitions 63 to be opened, in order subsequently to displace all.

The mold 8 is then transported into another region of the plant, and the operation begins again with a new mold.

Significant advantages are achieved with the invention.

The separating machine 1 namely makes it possible to synchronize a plurality of paths even for highly irregular objects 100. In particular, the working steps after the forwarding phase are all perfectly synchronized.

This is possible owing to the concept of adjusting and/or of controlling and/or of regulating the vibrations after the detection of an object located in the outlet, but also owing to the individual shaking devices and similar devices, as have been described above.

The separating machine 1 is also simple and economic. In particular, the machine does not comprise the complex mechanical part which generally consists of complex and expensive shaking devices 3.

The machine is also highly robust and scarcely vulnerable to breakdown since different mechanical components are simply not present.

The invention may comprise variants which fall within the range of the inventive concept and within the scope of protection which is defined by the claims and their technical equivalents.

The invention claimed is:

1. A machine for separating elements comprising:
a plurality of paths, of which each forming a feed path and each being suitable for forwarding the elements lined up along the feed path, wherein the path includes an outlet opening through which the elements exit,
and wherein said machine comprises:
a plurality of shaking devices, of which each is connected to only one of the plurality of paths and can transmit mechanical vibrations to a connected path in order to bring about feeding of the elements along the feed path, detection means for detection of the elements leaving the path, which detection means can essentially detect passage of the elements through the outlet opening, control means of the machine, which control means is functionally connected to the detection means and to the shaking devices and can order stoppage of one of the shaking devices if the detection means detects the passage of an element through the outlet opening of the connected path, the machine further comprising:

collection means for collection of the objects downstream of the paths, which collection means can collect the objects after the objects exit from the paths, forwarding means for forwarding the objects, which forwarding means permits forwarding of the objects simultaneously from the collection means to a mold, and in which the forwarding means can forward the objects if each of the paths has forwarded one or the defined number of objects into the collection means, and the collection means comprise a funnel downstream of each of the paths, and in which the forwarding means each comprise a partition and a channel, the partition is suitable for closing the channel, the forwarding means also comprises means for opening the partitions, which means for opening can open all of the partitions at the same time and, therefore, simultaneous forwarding of the objects is possible.

2. The machine as claimed in claim 1, in which each of the shaking devices comprises generation means for generation of an electromagnetic wave, an electromagnetic drive which is driven directly by the generation means and can generate vibrations with respect to a holding plane, a frequency and a magnitude of which vibrations are correlated with the electromagnetic wave, transmission members which can transmit the vibrations generated by the electromagnetic drive to an external element, and an amplifier which can amplify the vibrations generated by the electromagnetic drive and comprises the following:

at least one fixed part which is fixedly connected to the holding plane, at least one movable part which is fixedly connected to the path, a loaded part which is fixedly connected to the transmission members, and means for generation of potential, which can amplify the vibrations transmitted by transmission means.

3. The machine as claimed in claim 2, in which the means for generation of potential comprise elastic elements which can mechanically connect the fixed part and the movable part to one another.

4. The machine as claimed in claim 2, wherein the transmission means is a shaft.

5. The machine as claimed in claim 1, wherein the detection means for detection of elements is optical means.

6. The machine as claimed in claim 1, wherein the detection means for detection of elements leaving the path is means for detection of the passage of an element through an outlet opening.

7. A machine for separating elements comprising:

a plurality of paths, of which each forming a feed path and each being suitable for forwarding the elements lined up along the feed path, wherein the path includes an outlet opening through which the elements exit, and wherein said machine comprises:

a plurality of shaking devices, of which each is connected to only one of the plurality of paths and can transmit mechanical vibrations to a connected path in order to bring about feeding of the elements along the feed path, detection means for detection of the elements leaving the path, which detection means can essentially detect passage of the elements through the outlet opening, control means of the machine, which control means is functionally connected to the detection means and to the shaking devices and can order stoppage of one of the shaking devices if the detection means detects the passage of an element through the outlet opening of the connected path, the machine further comprising:

collection means for collection of the objects downstream of the paths, which collection means can collect the objects after the objects exit from the paths, forwarding means for forwarding the objects, which forwarding means permits forwarding of the objects simultaneously from the collection means to a mold, and in which the forwarding means can forward the objects if each of the paths has forwarded one or the defined number of objects into the collection means, and the collection means comprise a drum which comprises seats for the objects, which seats face an outer surface of the drum, and in which the forwarding means consist of a motor for rotating the drum, and the seats face the outlet opening or the mold depending on the position of the drum.

* * * * *